(12) United States Patent
Kesler

(10) Patent No.: US 12,476,517 B2
(45) Date of Patent: Nov. 18, 2025

(54) HOLLOW, MAGNETIC FLYWHEEL AND RELATED GENERATOR SYSTEMS

(71) Applicant: MATTUR, LLC, Scottsdale, AZ (US)

(72) Inventor: Kris Kesler, Paradise Valley, AZ (US)

(73) Assignee: MATTUR HOLDINGS, INC., Scottsdale, AZ (US)

( * ) Notice: Subject to any disclaimer, the term of this patent is extended or adjusted under 35 U.S.C. 154(b) by 711 days.

(21) Appl. No.: 17/569,959

(22) Filed: Jan. 6, 2022

(65) Prior Publication Data

US 2022/0231572 A1 Jul. 21, 2022

Related U.S. Application Data

(60) Provisional application No. 63/140,057, filed on Jan. 21, 2021.

(51) Int. Cl.
| | | |
|---|---|---|
| *H02K 7/02* | (2006.01) | |
| *H02K 7/09* | (2006.01) | |
| *H02K 21/24* | (2006.01) | |

(52) U.S. Cl.
CPC ............ *H02K 7/02* (2013.01); *H02K 7/09* (2013.01); *H02K 21/24* (2013.01); *F16C 2361/55* (2013.01); *F16C 2380/28* (2013.01)

(58) Field of Classification Search
CPC ............ H02K 7/02; H02K 7/09; H02K 21/24; H02K 7/1807; H02K 7/025; H02K 21/22; H02K 21/222; F16C 2361/55; F16C 2380/28; F16C 15/00; Y02E 60/16
USPC ............................................. 310/74, 156.31
See application file for complete search history.

(56) References Cited

U.S. PATENT DOCUMENTS

| | | | |
|---|---|---|---|
| 4,371,801 A * | 2/1983 | Richter | ............... H02K 21/029 310/191 |
| 5,590,568 A | 1/1997 | Takara | |
| 5,894,183 A | 4/1999 | Borchert | |
| 6,236,127 B1 * | 5/2001 | Bornemann | ............ F16F 15/31 310/90.5 |

(Continued)

FOREIGN PATENT DOCUMENTS

| | | |
|---|---|---|
| CN | 102624177 A | 8/2012 |
| CN | 102882332 A | 1/2013 |

(Continued)

OTHER PUBLICATIONS

CN 112018945; Dec. 1, 2020; Wang et al. (Year: 2020).*

(Continued)

*Primary Examiner* — Ahmed Elnakib
(74) *Attorney, Agent, or Firm* — K&L Gates LLP

(57) ABSTRACT

Methods and systems for improved power generation are provided. In one embodiment, a flywheel is provided for use in a generator. The flywheel may include hollow disks that each contain a plurality of magnets that are angularly distributed around the hollow disks. The hollow disks may be fastened together using disk attachment brackets that attach to attachment points on the hollow disks. Stator disks, which may be separate from the flywheel, may be positioned between adjacent pairs of the hollow disks. The stator disks may contain multiple coils of wire that are angularly distributed around the stator disks. In operation, the flywheel may rotate while the stator disks remain stationary.

35 Claims, 11 Drawing Sheets

(56) References Cited

U.S. PATENT DOCUMENTS

| | | | |
|---|---|---|---|
| 6,794,776 B1* | 9/2004 | Gabrys | H02K 7/025 |
| | | | 310/90.5 |
| 7,624,830 B1* | 12/2009 | Williams | B60K 7/0007 |
| | | | 180/65.6 |
| 7,834,495 B1 | 11/2010 | Mitchell | |
| 2005/0029886 A1* | 2/2005 | Van Tichelen | H02K 21/24 |
| | | | 310/156.32 |
| 2007/0040465 A1* | 2/2007 | Al-khayat | H02K 3/28 |
| | | | 310/216.106 |
| 2008/0088200 A1* | 4/2008 | Ritchey | H02K 21/12 |
| | | | 310/112 |
| 2009/0302808 A1* | 12/2009 | Patel | H02K 53/00 |
| | | | 322/4 |
| 2009/0309462 A1* | 12/2009 | Maekawa | H02K 5/1735 |
| | | | 310/67 R |
| 2014/0300227 A1* | 10/2014 | Kalev | F16H 33/02 |
| | | | 310/74 |
| 2016/0329795 A1* | 11/2016 | Ricci | H02K 1/2798 |
| 2018/0115233 A1 | 4/2018 | Wong | |
| 2018/0287457 A1 | 10/2018 | Takara | |
| 2019/0199164 A1* | 6/2019 | Gieras | H02K 7/025 |
| 2020/0227991 A1 | 7/2020 | Boettcher | |
| 2021/0218322 A1* | 7/2021 | Mihaila | H02K 5/203 |
| 2021/0273501 A1* | 9/2021 | Koeda | H02K 1/2796 |
| 2021/0408883 A1* | 12/2021 | Wong | H02N 15/00 |
| 2022/0231572 A1* | 7/2022 | Kesler | H02K 7/1807 |
| 2023/0179061 A1* | 6/2023 | Kesler | H02K 21/24 |
| | | | 310/74 |

FOREIGN PATENT DOCUMENTS

| | | | |
|---|---|---|---|
| CN | 108199511 A | | 6/2018 |
| CN | 112186915 A | | 1/2021 |
| CN | 212277995 U | | 1/2021 |
| EP | 0004423 | * | 10/1979 |
| JP | 2004080860 A | | 3/2004 |
| WO | 2019138308 A1 | | 7/2019 |
| WO | WO 2019/138308 | * | 7/2019 |

OTHER PUBLICATIONS

KR 20200141209; Cho Hyung Geun (Year: 2020).*
International Preliminary Report on Patentability for related International Application No. PCT/US22/11478; action dated Aug. 3, 2023; (8 pages).
International Search Report and Written Opinion for related International Application No. PCT/US22/11478; action dated May 11, 2022; (10 pages).
Extended European Search Report for related European Application No. 22742979.2; action dated Dec. 2, 2024; (12 pages).
Substantive Report for related Saudi Arabian Application No. 523450005; (6 pages).

* cited by examiner

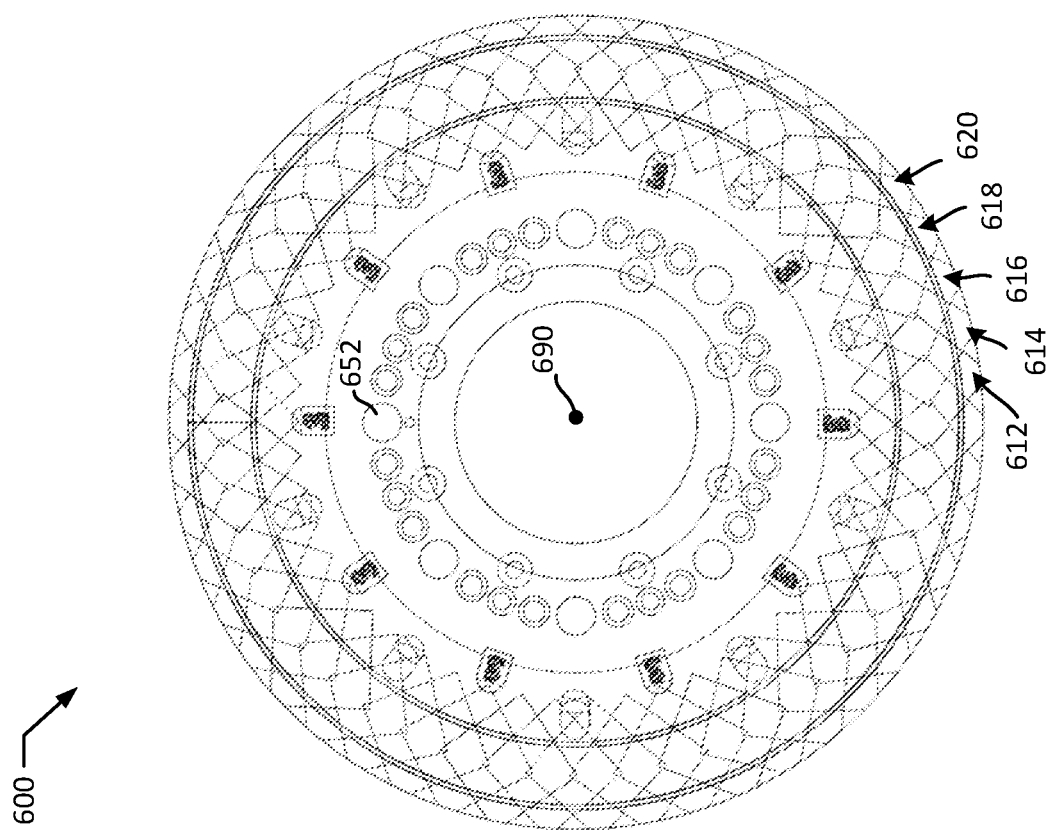
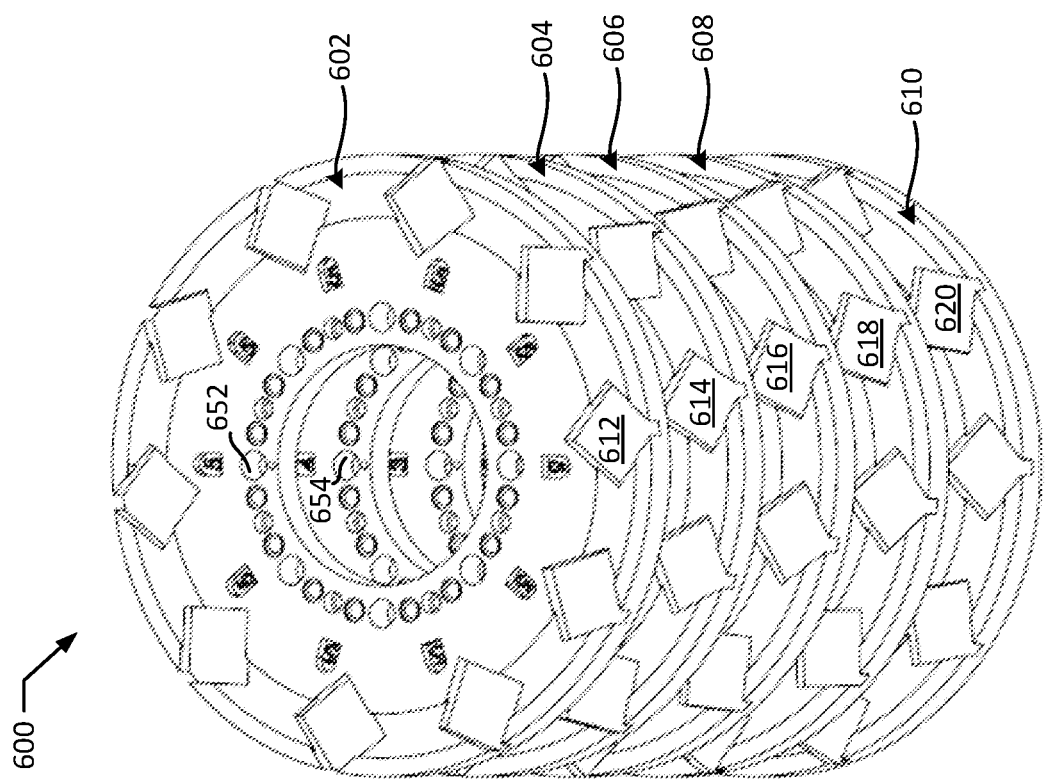

HOLLOW, MAGNETIC FLYWHEEL AND RELATED GENERATOR SYSTEMS

CROSS-REFERENCE TO RELATED APPLICATION

This application claims priority from U.S. Prov. App. No. 63/140,057 filed on Jan. 21, 2021, the entirety of which is incorporated herein by reference.

BACKGROUND

Generators may be used to generate electricity using other energy sources. In particular, generators may produce electricity by rotating one or more permanent magnets to create a varying magnetic field that induces an electric current, which is output by the generator.

SUMMARY

The present disclosure includes new and innovative systems and methods for improved power generation and/or energy storage.

In an example, a flywheel is provided for use in a generator. The flywheel includes a plurality of hollow disks. Each hollow disk of the plurality of hollow disks includes a plurality of magnets angularly distributed around the hollow disk and a plurality of attachment points. The flywheel also includes a plurality of disk attachment brackets fastened to the plurality of hollow disks via the plurality of attachment points. The plurality of hollow disks may be spaced to accommodate a stator disk positioned between adjacent hollow disks.

In an example, a generator is provided that includes a flywheel. The flywheel may include a plurality of hollow disks containing a plurality of magnets angularly distributed around the plurality of hollow disks and a plurality of disk attachment brackets fastened to the plurality of hollow disks. The generator may also include a plurality of stator disks positioned between adjacent hollow disks of the plurality of hollow disks. The plurality of stator disks may contain a plurality of coils angularly distributed around the plurality of stator disks.

In an example, a method is provided that includes assembling, with a plurality of disk attachment brackets, a plurality of hollow disks into a plurality of flywheel sections. The plurality of hollow disks may contain a plurality of magnets. The method may further include positioning, between adjacent hollow disks of the plurality of hollow disks, a plurality of stator disks containing a plurality of coils. The method may also include assembling the plurality of flywheel sections into a flywheel, attaching the flywheel at a single point in a generator, and rotating the flywheel while keeping the stator disks stationary to generate electrical current output by the generator.

In an example, a flywheel for use in a generator is provided. The flywheel includes a plurality of flywheel sections. Each flywheel section may include a plurality of hollow disks spaced to accommodate one or more stator disks, and a plurality of brackets angularly distributed around the hollow disks. The plurality of brackets are configured to receive permanent magnets. Each of the plurality of flywheel sections is hollow along an axis of rotation. At least one of the plurality of flywheel sections is formed from a single piece of material as a single structure using additive manufacturing.

In an example, a device is provided. The device includes a plurality of rotor disks disposed in a coaxial arrangement and configured to rotate about a rotor axis. The plurality of rotor disks includes a first disk and a second disk adjacent to the first disk in the coaxial arrangement. The device also includes a first plurality of magnets disposed in the first disk. The first plurality of magnets is angularly distributed about the rotor axis according to a distribution pattern. The device also includes a second plurality of magnets disposed in the second disk. The second plurality of magnets is angularly distributed about the rotor axis according to the distribution pattern. First angular positions of the first plurality of magnets about the rotor axis are offset from corresponding second angular positions of the second plurality of magnets.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIGS. 6A-6C illustrate another example flywheel section for use in a generator according to an exemplary embodiment of the present disclosure.

DETAILED DESCRIPTION OF EXAMPLE EMBODIMENTS

Certain generator designs may include flywheels that contain one or more permanent magnets. These flywheels may then be rotated (e.g., by a motor) to generate the electric current output by the generator. Such conventional flywheels are typically solid in construction. For example, conventional flywheels are typically formed from a solid permanent magnet. Such configuration allows for a larger electric current to be generated for each rotation of the flywheel. However, such flywheels also require greater energy to rotate, as the solid core of the flywheels increases the weight of the flywheel. Furthermore, solid cores have comparatively low moments of inertia, which can cause the flywheels to lose rotational speed (and corresponding power output) in certain operational scenarios, such as when heavy loads are connected to the generator.

Therefore, there exists a need for a generator designed to include and use a hollow flywheel to generate electric current. One solution to this problem is to use a flywheel created from multiple disks. The disks may include arrangements of magnets that are radially arranged near an outer edge of the disks. The disks may be hollow and may be axially aligned into one or more sections to form a flywheel for use in a generator. Stator disks may be arranged between the disks of the flywheel. The stator disks may contain coils of wire in which electrical current is generated as the flywheel rotates. Such designs may reduce the overall weight of the flywheel and/or may increase the moment of inertia for the flywheel, by concentrating the mass of the flywheel near the outer edge of the flywheel.

Figure 1A:
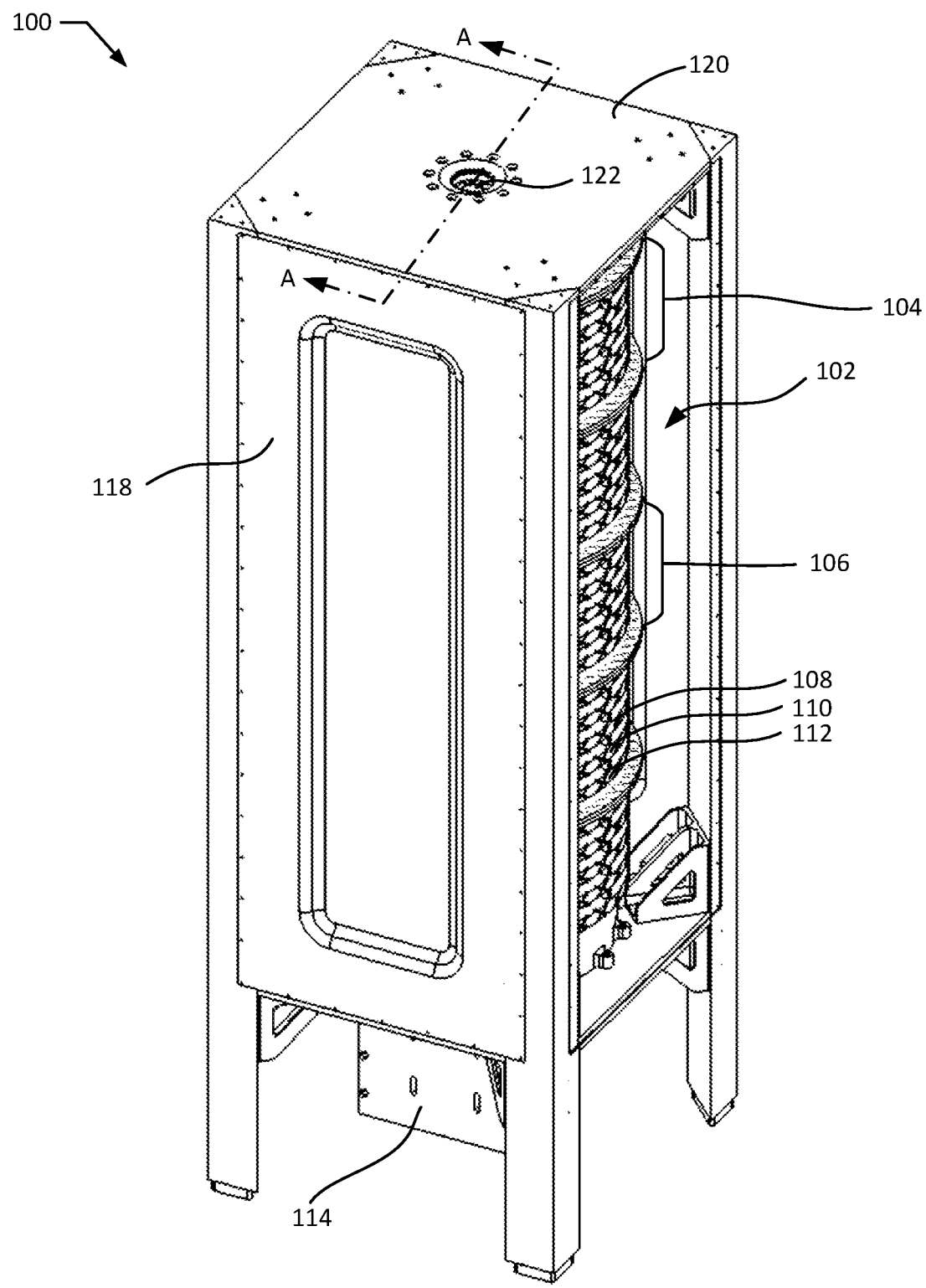
FIG. 1A is a perspective view of a generator according to an exemplary embodiment of the present disclosure.
Figure 1B:
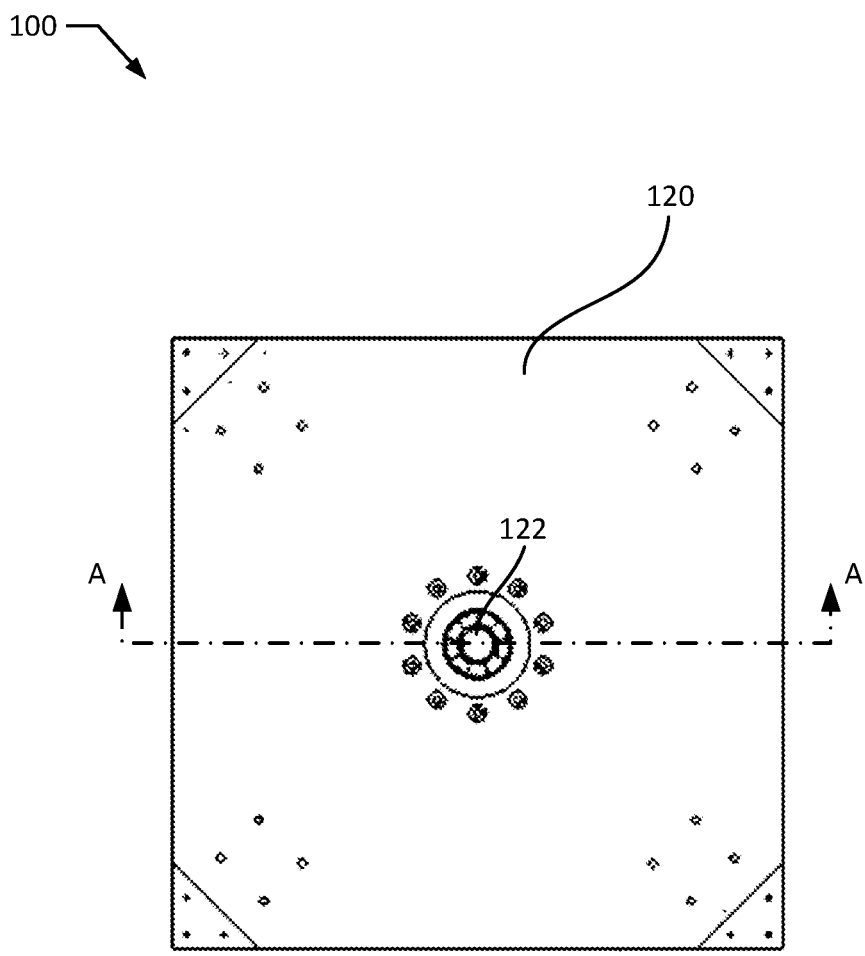
FIG. 1B is a top view of the generator of FIG. 1A.

FIGS. 1A-1B illustrate a generator 100 according to an exemplary embodiment of the present disclosure. In particular, FIG. 1A depicts a perspective view of the generator 100 and FIG. 1B depicts a top view of the generator 100. The generator 100 includes a flywheel 102, which may rotate to generate power output by the generator 100. The generated power may be provided to an electrical load of the generator. In certain implementations, the flywheel 102 may be oriented vertically within the generator 100 as depicted. In other implementations, the flywheel 102 may be oriented horizontally within the generator 100. Rotation of the flywheel 102 may be powered at least in part by a motor 114. The motor 114 may be positioned near one end of the flywheel 102. For example, as depicted, the motor 114 may be positioned at a bottom end of the generator 100. The motor 114 may be used to initially power the rotation of the flywheel 102. For example, the motor 114 may be used to initialize rotation of the flywheel 102. In additional or alternative implementations, the motor 114 may continue to power the rotation of the flywheel 102 after initializing. The motor 114 may be powered from an alternative energy source, such as fossil fuels, solar power, wind power, or any other energy source.

The flywheel 102 may be formed from one or more flywheel sections 104, 106 (only a subset of which are numbered in FIG. 1A). The flywheel sections 104, 106 may be formed from one or more disks 108, 110, 112. The disks 108, 110, 112 may include magnets positioned near an outer edge of the disks. Stator disks containing coils of wire (discussed further below) may be positioned between the disks 108, 110, 112. When the flywheel 102 is rotated, the disks 108, 110, 112, may rotate between the stator disks, causing the magnets to induce an electric current output by the generator 100. As discussed further below, the disks 108, 110, 112 may be substantially hollow in design, which may reduce the overall weight of the flywheel 102 and/or may increase the moment of inertia for the flywheel 102 when in operation). The flywheel sections 104, 106 may be joined together to form the flywheel 102. In this way, the flywheel sections 104, 106 may enable modular construction of the flywheel 102. Such modular construction may allow for customizable design and/or assembly of generators configured for a particular power output. For example, rather than having to redesign a flywheel for larger power outputs, a larger flywheel can be constructed by combining additional flywheel sections 104, 106 to create a longer and larger flywheel capable of outputting more power (e.g., in a larger generator). In certain instances, electric current output by V generator 100 may be processed by a power converter. For example, the power converter may receive the current output by the generator 100 and may convert the currents to power with one or more desired characteristics (e.g., desired voltage, desired AC frequency). In one specific example, the power converter may convert the current from the generator 100 to 120 V, 60 Hz current. Another specific example, the power converter may convert the current from the generator 100 to 240 V, 50 Hz current.

The generator 100 also includes a top plate 120 and side plates 118. The top plate 120 may support the flywheel 102 during operation within the generator 100. The top plate 120 includes a bearing attachment point 122, from which the flywheel 102 may be suspended during operation. The top plate 120 may also be configured to protect the generator 100 and associated internal components, such as the flywheel 102 and the disks 108, 110, 112. The side plate 118 may be positioned to protect the generator internal components in the side. For example, once fully assembled, the generator 100 may include side panels on all four sides of the generator 100 (e.g., left, right, front, and back sides). As depicted, the generator 100 may omit one of the side plates 118 to enable visibility of the internal components, such as the flywheel 102.

In some examples, the flywheel 102 is disposed in a vacuum chamber. For example, the side plates 118 (including a side plate (not shown) inserted to cover a front side of the generator 100) as well as the top plate 120, when assembled, may form an enclosure for the flywheel 102 from which air is pumped out to form a vacuum chamber for the flywheel 102. With this arrangement, reduced air friction during rotation of the flywheel can be achieved to further improve the efficiency of the generator 100.

Figure 1C:
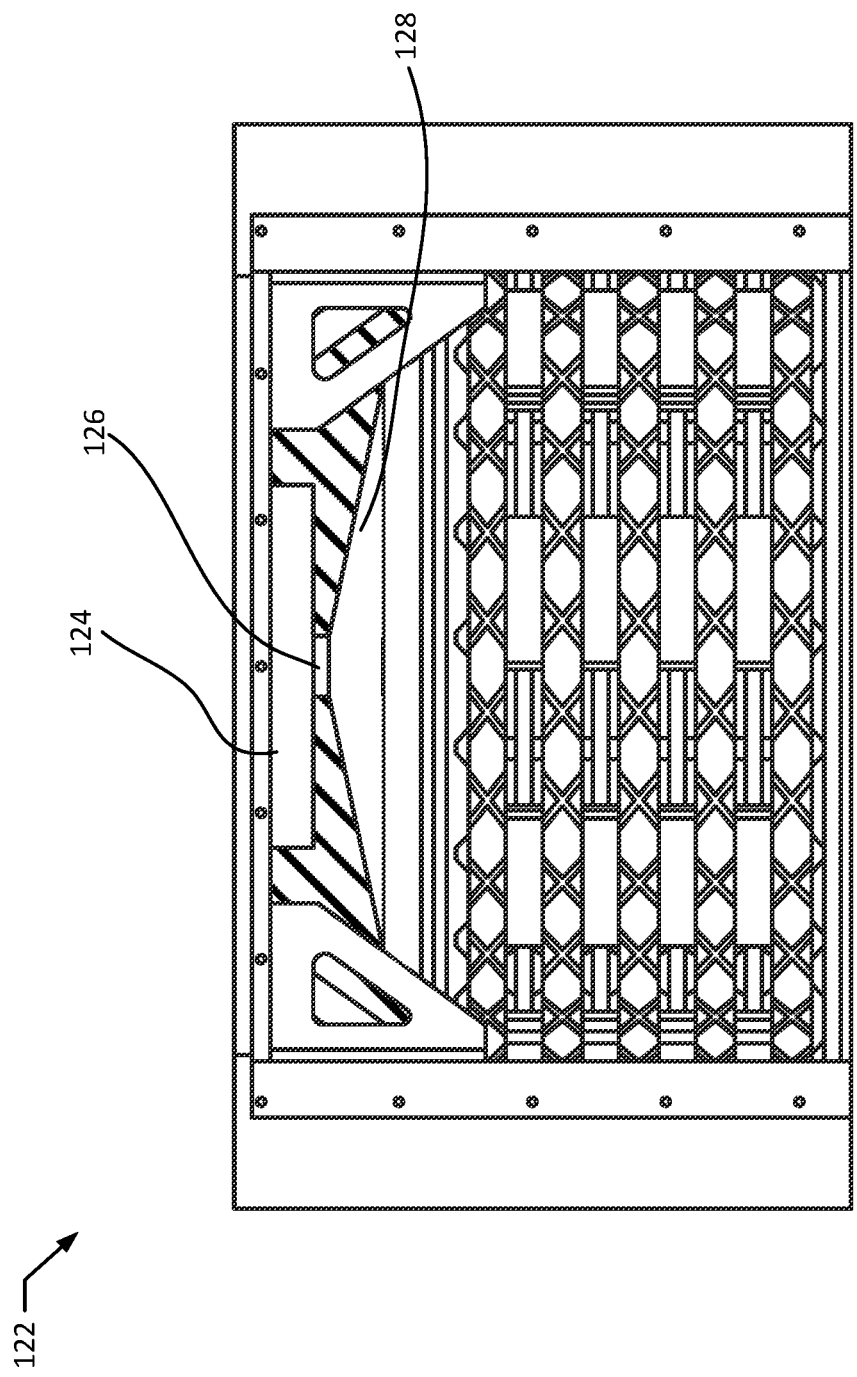
FIG. 1C is a detailed view of an example bearing attachment point of the generator of FIG. 1A.

FIG. 1C illustrates a detailed view of the bearing attachment point 122 of the generator 100 according to an exemplary embodiment of the present disclosure. To reduce friction, in some examples, the flywheel 102 may be suspended from a single point at the top of the generator 100. In particular, the flywheel 102 may be suspended from a bearing attachment point 122 located on a top plate 120 of the generator 100. In particular, a top portion 128 of the flywheel 102 may include a flywheel attachment bracket 126. A bearing housing 124 may be attached to the top plate 120. The bearing housing 124 may include multiple bearings (e.g., ball bearings, magnetic bearings) distributed throughout a bottom surface of the bearing housing 124. The flywheel attachment bracket 126 may rest on top of the bearings within the bearing housing 124. In this way, the weight of the flywheel 102 may be supported from a single point of the flywheel attachment bracket 126. Supporting the flywheel 102 in this way they reduce the overall friction imparted on the flywheel 102 while rotating, thereby increasing the power output and efficiency of the generator 100. In additional or alternative limitations, it should also be understood that the way to the flywheel 102 may be supported from multiple points of the flywheel attachment bracket 126 (e.g., supported by multiple bearings).

Figure 2:
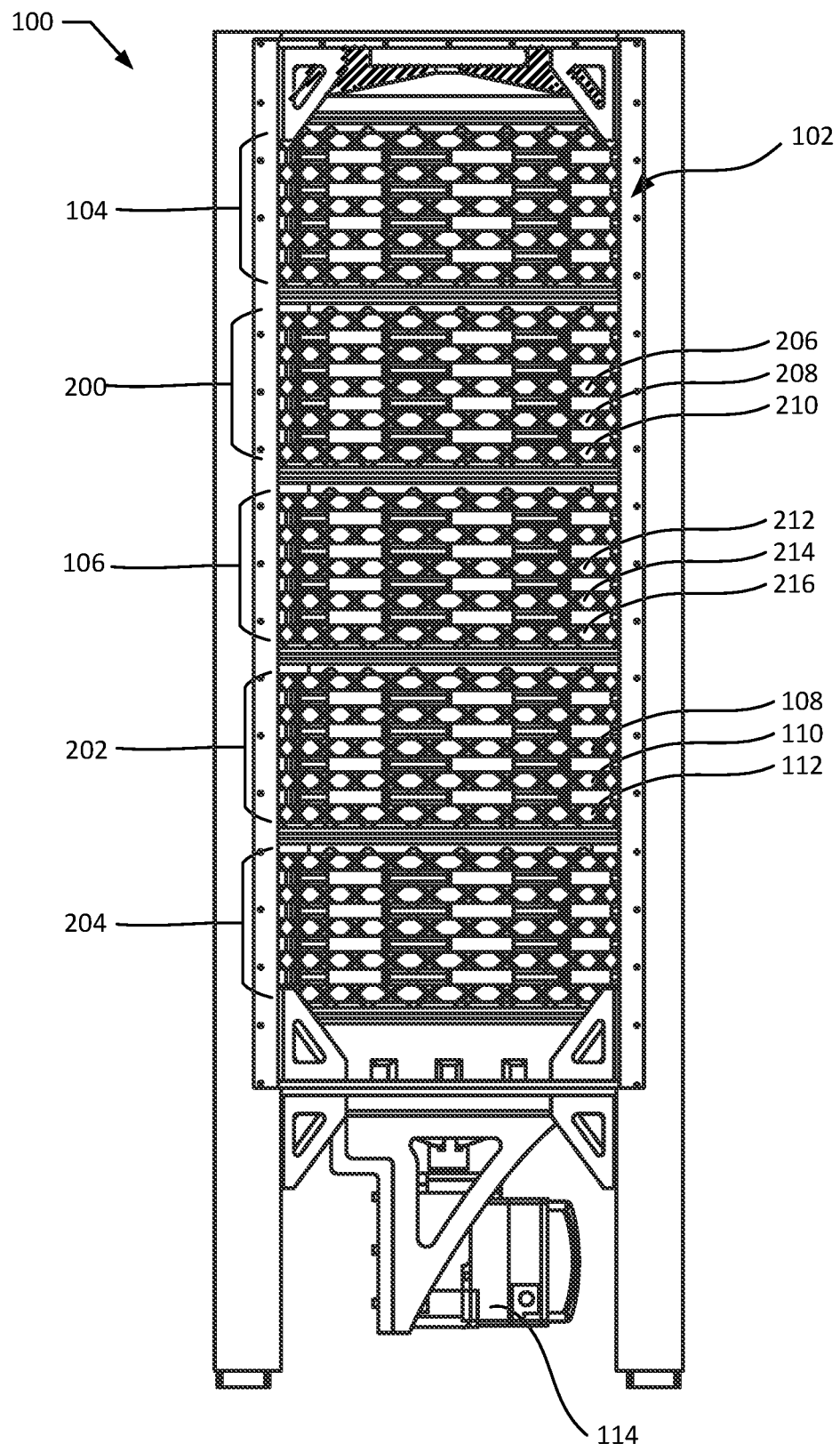
FIG. 2 is a side view of a generator according to an exemplary embodiment of the present disclosure.

FIG. 2 illustrates a side view of the generator 100 according to an exemplary embodiment of the present disclosure. As can be seen in the side view, the flywheel 102 includes five flywheel sections 104, 106, 200, 202, 204. Each flywheel section 104, 106, 200, 202, 204 is made from four disks 108, 110, 112, 206, 208, 210, 212, 214, 216. The disks 108, 110, 112, 206, 208, 210, 212, 214, 216 may contain permanent magnets located near an outer edge of the disks. Between the disks 108, 110, 112, 206, 208, 210, 212, 214, 216 are stator disks 218, 220, 222 (only a subset of which are numbered). The stator disks 218, 220, 222 may contain coils of wire in which an electric current is induced by the magnets from the disks 108, 110, 112, 206, 208, 210, 212, 214, 216 when the flywheel 102 rotates. In particular, the stator disks 218, 220, 222 may remain stationary when the flywheel 102 rotates and may be fixed to a housing of the generator 100.

The flywheel sections 104, 106, 200, 202, 204 may be assembled by joining multiple disks 108, 110, 112, 206, 208, 210, 212, 214, 216. In certain instances, stator disks 218, 220, 222 may be positioned between the disks 108, 110, 112, 206, 208, 210, 212, 214, 216 during assembly. For example, in certain implementations, the disks 108, 110, 112, 206, 208, 210, 212, 214, 216 and stator disks 218, 220, 222 may be spaced from one another such that the distance between the magnets in the disks 108, 110, 112, 206, 208, 210, 212, 214, 216 and coils of wire in the stator disks 218, 220, 222 is less than or equal to 0.5 inches (e.g., less than 0.25 inches, less than 0.1 inches, less than 0.5 inches). Assembled flywheel sections 104, 106, 200, 202, 204 may then be joined together to form a complete flywheel 102 for use within a generator 100. In certain implementations, each flywheel section 104, 106, 200, 202, 204 may be a discrete assembly capable of being independently added to or removed from the flywheel 102. For example, the disks 212, 214, 216 of a flywheel section 106 may be joined together to form an assembly capable of staying assembled when separated from the other flywheel sections 104, 106, 200, 202, 204. In additional or alternative implementations, all flywheel sections 104, 106, 200, 202, 204 may be assembled and stacked together before being joined as a single flywheel 102.

It should be understood that the flywheel 102 depicted in FIG. 2 is merely exemplary, and additional or alternative flywheel designs may be used in other implementations. For example, certain generators may use flywheels 102 containing more or fewer than five flywheel sections 104, 106, 200, 202, 204. For example, generators designed to output more power may include more flywheel sections (e.g., six or more flywheel sections). As another example, generators designed to output less power may include fewer flywheel sections (e.g., four or fewer flywheel sections). In still further implementations, the number of disks 108, 110, 112, 206, 208, 210, 214, 216 included in each flywheel section 104, 106, 200, 202, 204 may differ. As explained further below, certain configurations of the disks 108, 110, 112, 206, 208, 210, 212, 214, 216 may include magnets arranged to provide magnet propulsion as the flywheel rotates. In such instances, the number of disks 108, 110, 112, 206, 208, 210, 212, 214, 216 may be selected to maximize the magnetic propulsion while also balancing the number of magnets and coils of wire in the generator 100. In some examples, the generator 100 harnesses the magnetic energy from the magnets on the flywheel disks to generate the electrical energy in the coils and kinetic energy (e.g., magnetic propulsion) to facilitate further rotation of the flywheel 102. For example, certain implementations may include five disks in particular flywheel sections and/or three disks in particular flywheel sections. Further, the number of disks may differ for certain flywheel sections 104, 106, 200, 202, 204. For example, a first flywheel section may include three disks, a second flywheel section may include four disks, and a third flywheel section may include five disks.

The number of stator disks in the flywheel sections 104, 106, 200, 202, 204 may also differ in various implementations. For instance, in the generator 100, there is one more stator disk 218, 220, 222 in each flywheel section 104, 106, 200, 202, 204, such that each disk 108, 110, 112, 206, 208, 210, 212, 214, 216 is positioned between two stator disks 218, 220, 222. Certain implementations may differ from the depicted configuration. For example, certain flywheels may include the same number of flywheel disks and stator disks. As another example, certain flywheels may include fewer (e.g., one fewer) stator disks than flywheel disks.

Figure 3:
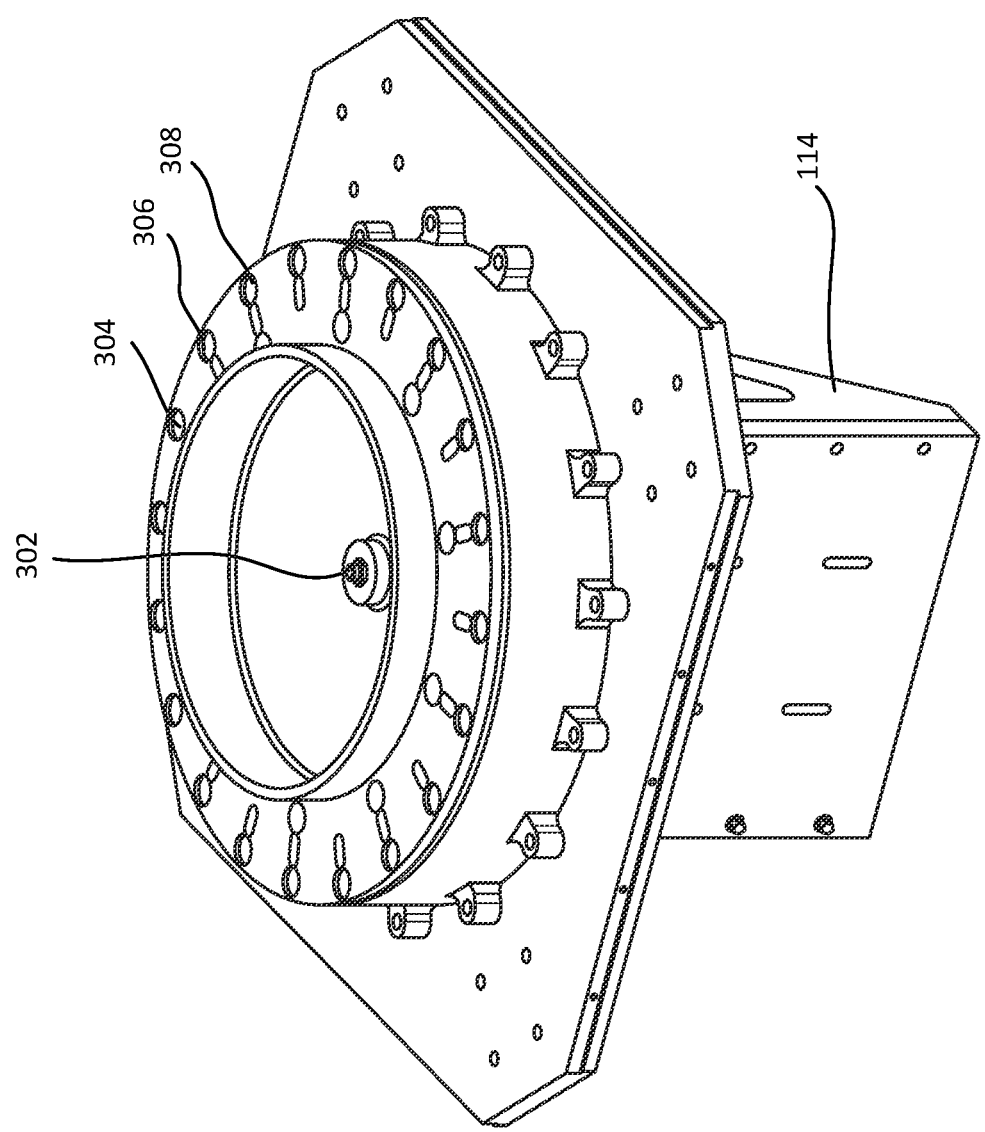
FIG. 3 illustrates an example base for use in a generator according to an exemplary embodiment of the present disclosure.

FIG. 3 illustrates a base 300 of the generator according to an exemplary embodiment of the present disclosure. For example, the base 300 may be an exemplary implementation of the base of the generator 100. The base 300 includes a motor 114 of the generator 100. The base 300 further includes a bottom attachment point 302 for the flywheel 102. The bottom attachment point may provide a single point of attachment to a bottom portion of the flywheel 102, or may provide multiple points of attachment, similar to the bearing attachment point 122. In certain implementations, the bottom attachment point 302 may include one or more magnets position to provide a lifting force on the bottom of the flywheel 102, to reduce the overall friction on the flywheel 102 as the flywheel 102 rotates. In practice, the bottom attachment point 302 may include one or more bearings (e.g., ball bearings, magnetic bearings), similar to the bearing attachment point 122.

The base 300 also includes multiple stabilization magnets 304, 306, 308 (only a subset of which are numbered). The stabilization magnets 304, 306, 308 are positioned radially along an upper portion of the base 300. In particular, the stabilization magnets 304, 306, 308 may be positioned near the bottom of the flywheel 102. The magnets 304, 306, 308 may be arranged to oppose the magnetic fields of the magnets within the disks of the flywheel 102. Such configurations may provide both a lifting force on the bottom of the flywheel 102 (reducing friction on the flywheel 102 with the flywheel 102 rotates) and may prevent the flywheel 102 from wobbling or otherwise tilting an operation. In practice, this may result in reduced energy required to maintain rotation of the flywheel 102, improving overall output efficiency and spin downtime for the flywheel 102. The stabilization magnets 304, 306, 308 may also reduce wobbling or other off-axis rotations of the flywheel 102 while rotating, which may prevent damage to components of the generator 100 and/or may improve the operating efficiency of the generator 100.

Figures 4A, 4B:
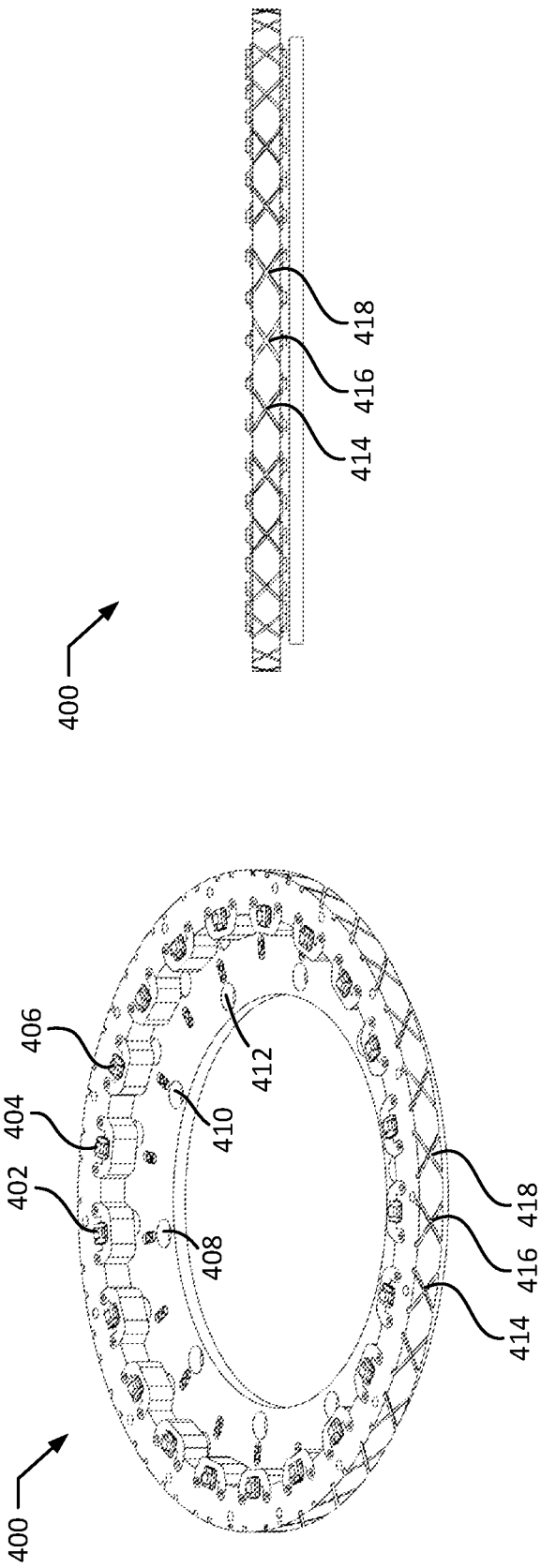
FIGS. 4A-4C illustrate an example stator disk for use in a generator according to an exemplary embodiment of the present disclosure.
Figure 4C:
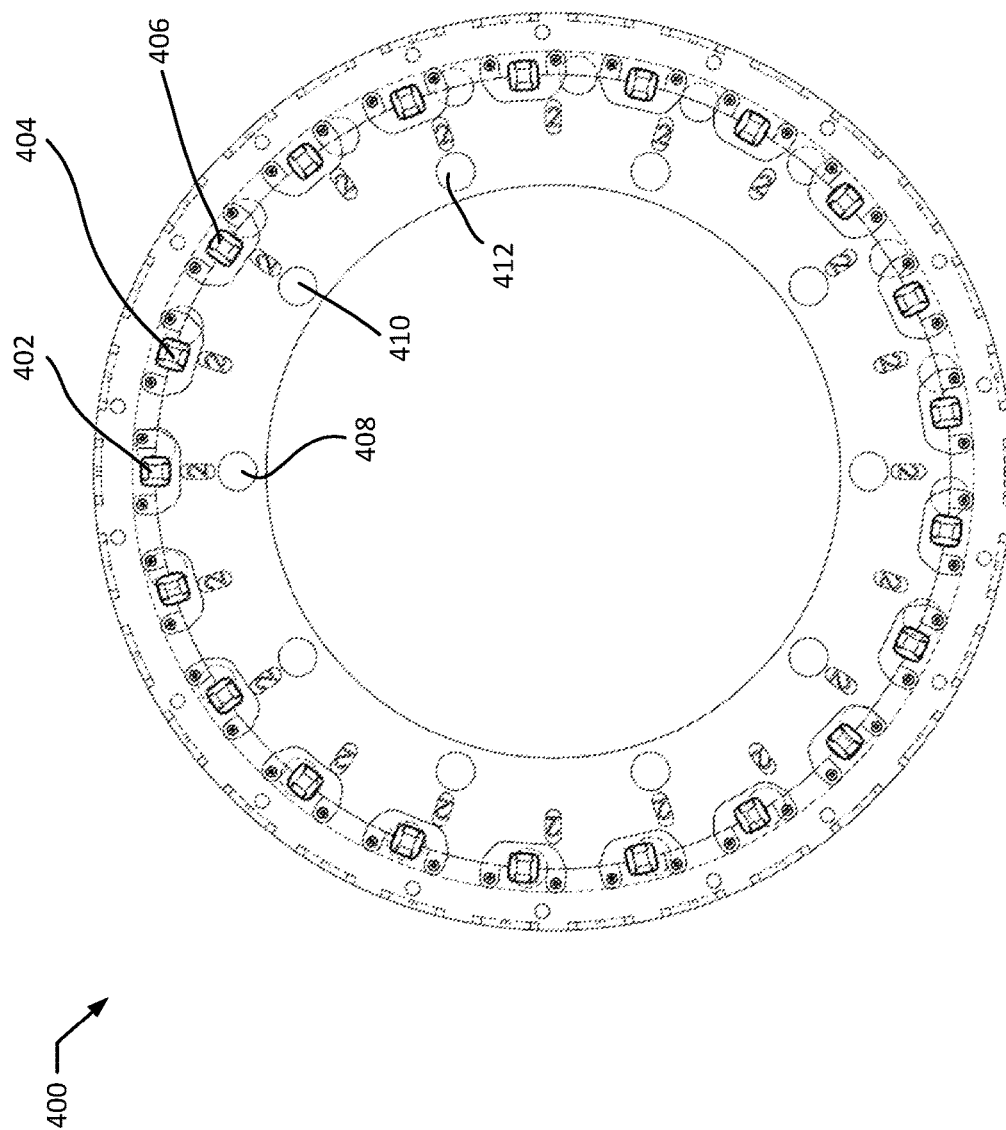

FIGS. 4A-4C illustrate a stator disk 400 for use in a generator according to an exemplary embodiment of the present disclosure. For example, the stator disk 400 may be positioned between disks of a flywheel 102 of the generator 100. The stator disk 400 may include one or more coils of wire. For example, the stator disk 400 includes multiple brackets 402, 404, 406 and grooves 414, 416, 418 (only a subset of which are numbered). Coils of wire (not depicted) may be wound around the brackets 402, 404, 406 and in the grooves 414, 416, 418 within the disk 400. In certain implementations, the same size wire may be used for all coils of the stator disk 400. In additional or alternative implementations, different sizes of wire may be used for different coils of the stator disk 400. Furthermore, in certain implementations, all of the mounting points 402, 404, 406 may include coils of wire. In other implementations, only a subset of the mounting points 402, 404, 406 may include coils of wire.

The stator disk 400 also includes attachment points 408, 410, 412. The attachment points 408, 410, 412 may be used to attach the stator disk 400 so that the stator disk 400 stays in place while the flywheel rotates.

Figure 5B:
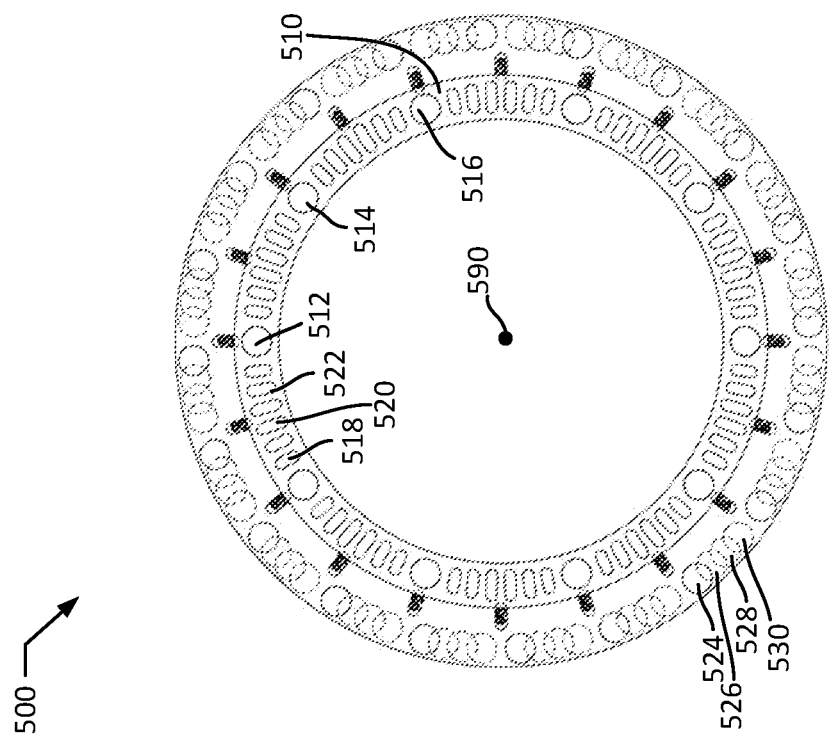
FIGS. 5A-5C illustrate an example flywheel section for use in a generator according to an exemplary embodiment of the present disclosure.
Figure 5A:
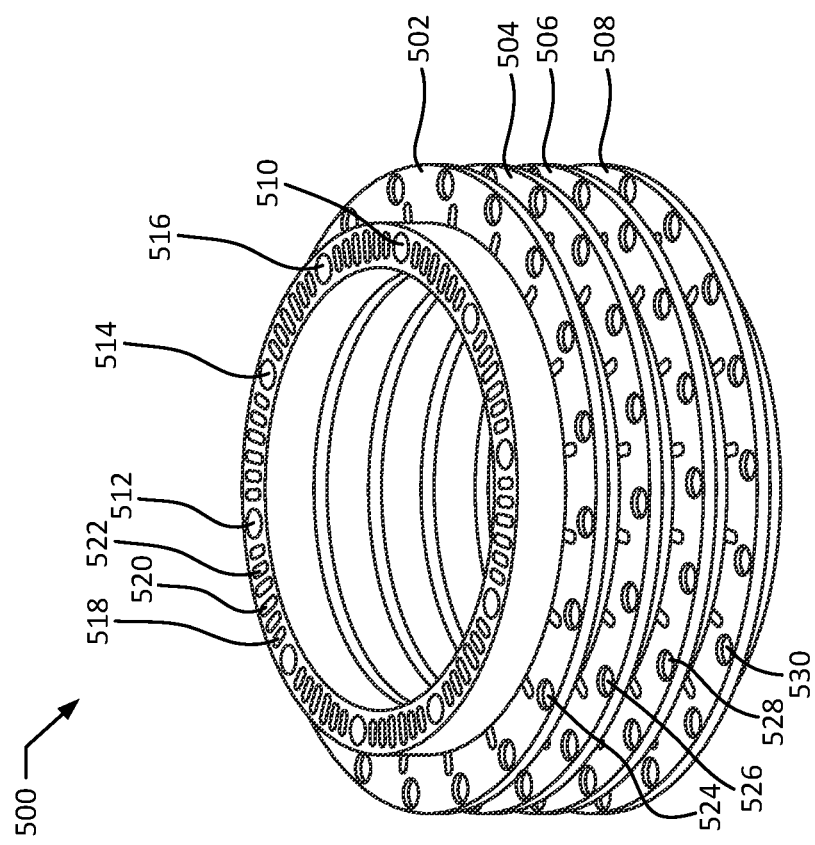
Figure 5C:
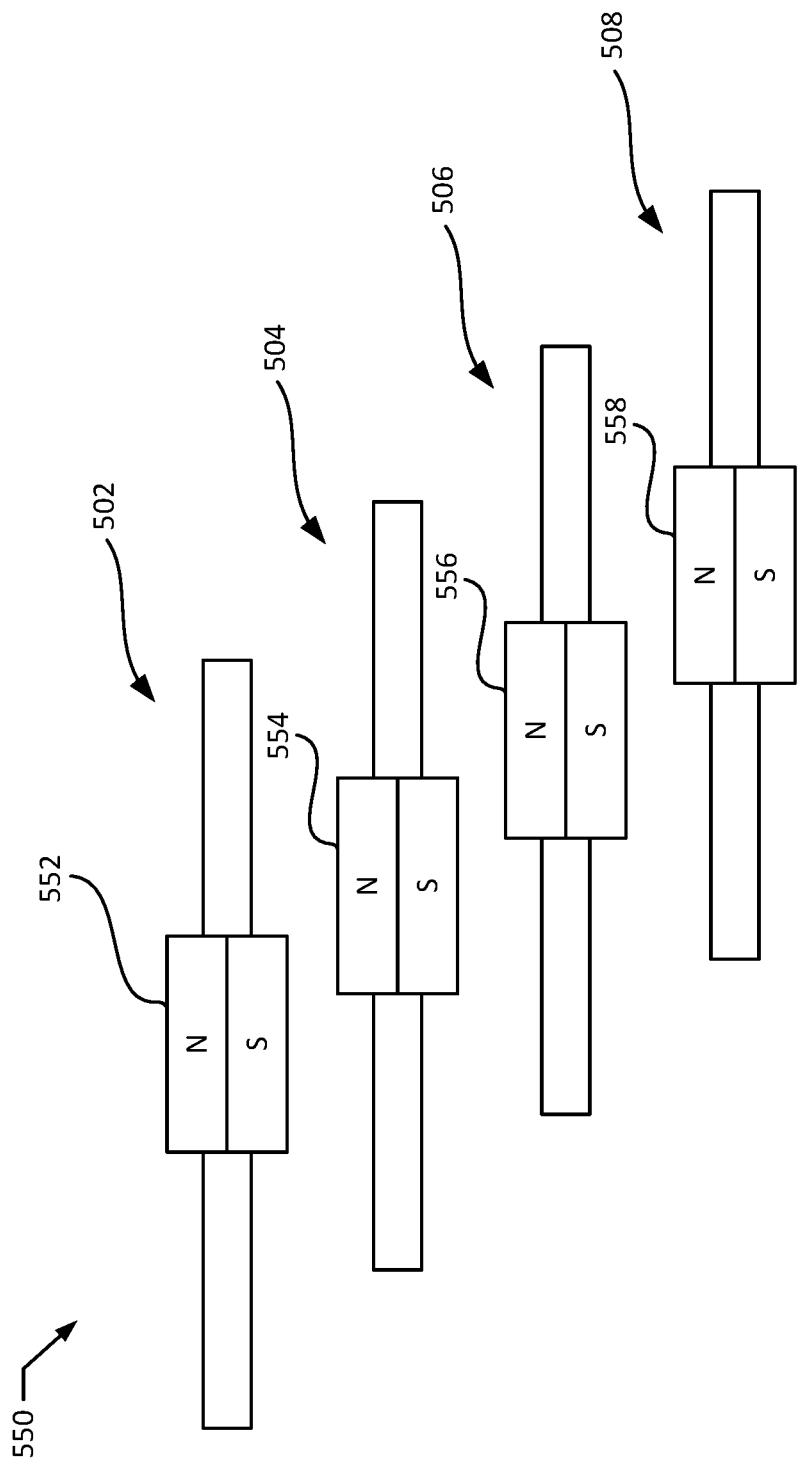

FIGS. 5A-5C illustrate a flywheel section 500 for use in a generator 100 according to an exemplary embodiment of the present disclosure. FIG. 5A is a perspective view of the flywheel section 500. The flywheel section 500 is assembled from four disks 502, 504, 506, 508. The disks 502, 504, 506, 508 are joined together using disk attachment brackets 510 (only one of which is numbered). Disk attachment brackets 510 may attach to the disks 502, 504, 506, 508 using multiple bracket attachment points 512, 514, 516 bracket attachment points 512, 514, 516 may be fastened to attachment points of the disks 502, 504, 506, 508. For example, once a flywheel section 500 (or an entire flywheel 102) is assembled, bolts (e.g., carbon fiber bolts, steel bolts) may be threaded through the entire length of the flywheel section 500 (or flywheel 102) within the bracket attachment points 512, 514, 516. The bolts may then be tightened to fasten together the disks 502, 504, 506, 508 and the disk attachment brackets 510, thereby forming a flywheel section 500 and/or a flywheel 102. Although not depicted in the flywheel section 500, when finally assembled one or more stator disks 218, 220, 222, 400 may be positioned between the disks 502, 504, 506, 508 (e.g., surrounding the disk attachment brackets 510).

The disks 502, 504, 506, 508 include brackets 524, 526, 528, 530 radially arranged along an exterior portion of the disks 502, 504, 506, 508. The brackets 524, 526, 528, 530 may receive permanent magnets. In certain implementations, the disks 502, 504, 506, 508 may be arranged within the flywheel section 500 such that the brackets 524, 526, 528, 530 are helically arranged around the exterior of the flywheel section 500 (e.g., to form a spiraling pattern). This arrangement can be seen in the changing angular position of the brackets 524, 526, 528, 530 within adjacent disks 502, 504, 506, 508.

FIG. 5B is a top view of the flywheel section 500. In the illustration of FIG. 5B, an axis of rotation 590 of the flywheel section 500 extends through the page (e.g., in a perpendicular direction. For purposes of illustration, some features (e.g., brackets 526, 528, 530, etc.) of the disks 504, 506, 508 below the disk 502 are projected onto the illustration of disk 502 in FIG. 5B using dashed lines. As shown in FIG. 5B, the top view of the flywheel section 500 demonstrates that the brackets 524, 526, 528, 530 have different angular positions about the axis 590 once the disks 502, 504, 506, 508 are assembled. In an example, the disks 502, 504, 506, 508 are attached (e.g., via the supports 510, etc.) such that the disks 502-508 simultaneously rotate about axis 590 to maintain the relative (e.g., staggered) angular positions of the brackets 524-530, etc. during rotation of the disks 502-508.

In some examples, assembling flywheel section 500 as shown in FIGS. 5A-5B may reduce an overall weight of a complete flywheel 102 used within a generator. In particular, by assembling the flywheel sections 500 from hollow disks 502, 504, 506, 508, the overall weight of the flywheel 102 may be reduced by removing excess weight for interior portions of the disks. Similarly, the disk attachment bracket 510 may be designed for reduced weight. In some examples, the disk attachment bracket 510 may include one or more openings 518, 520, 522 that are empty to reduce the overall weight of the disk attachment bracket 510, while still ensuring sufficient structural rigidity to sustain operating loads for the flywheel 102. Furthermore, the disks 502, 504, 506, 508 and/or the disk attachment bracket 510 may be formed from materials selected to reduce the overall weight of the assembled flywheel section 500. For example, the disks 502, 504, 506, 508 and the disk attachment bracket 510 may be assembled from plastic (e.g., ABS plastic) and/or lightweight metals (e.g., titanium, aluminum). As will be appreciated by one skilled in the art in light of the present disclosure, however, additional or alternative materials may be used to form one or more disks 502, 504, 506, 508 and/or disk attachment brackets 510, such as steel, carbon fiber, and the like.

In some examples, rather than assembling flywheel section 500 from multiple separate hollow disks 502, 504, 506, 508 and multiple disk attachment brackets 510, the flywheel section 500 may alternatively be formed as a single physical structure using a single piece of material (e.g., a single, contiguous carbon fiber component). In such instances, the flywheel section 500 formed by a single piece of material may have a similar geometry to the hollow disks 502, 504, 506, 508 and disk attachment brackets 510 once assembled. In certain implementations, such flywheel sections 500 may be manufactured or created using one or more additive techniques, such as 3D printing. In certain implementations, forming flywheel sections 500 from single pieces of material may reduce variance of the components (e.g., weight distribution of the disks 502, 504, 506, 508 and disk attachment brackets 510). For example, a flywheel section 500 formed from single pieces of material may be better balanced in operation, allowing for higher rotational speeds and/or higher operating efficiencies. Furthermore, in some instances, flywheel sections 500 formed from single pieces of material may reduce assembly time, as individual hollow disks 502, 504, 506, 508 and disk attachment brackets 510 do not need to be separately assembled to form the flywheel section 500.

FIG. 5C illustrates a conceptual view 550 of the flywheel section 500. In particular, the conceptual view 550 depicts partial cross-section views of portions of the disks 502-508 where the brackets 524-530 are located. Relatedly, as depicted in the conceptual view 550 of FIG. 5C, magnets 552, 554, 556, 558 may be disposed in the brackets 524, 526, 528, 530 of the disks 502, 504, 506, 508 and positioned such that opposing magnetic fields of magnets 552, 554, 556, 558 in adjacent disks 502, 504, 506, 508 are aligned. In the illustrated example of FIG. 5C, northern poles of all the magnets 552, 554, 556, 558, etc. in the respective disks 502-508 are magnetically aligned and oriented in a same direction (e.g., toward a top of the flywheel section 500), although it is noted that other implementations are possible. Furthermore, in some implementations, the brackets 524, 526, 528, 530 may contain metal shielding (e.g., using non-magnetic metals) to surround one or more sides of the magnets (e.g., 502-508, etc.) placed within the brackets 524, 526, 528, 530, etc. In one example, the brackets 524, 526, 528, 530 may contain copper surrounding the magnets. In certain implementations, such metals may increase fields definition for the magnets within the brackets 524, 526, 528, 530, thereby increasing electromagnetic wave strengths produced by the generator and increasing the overall operating efficiency and power output of the generator.

Figure 6C:
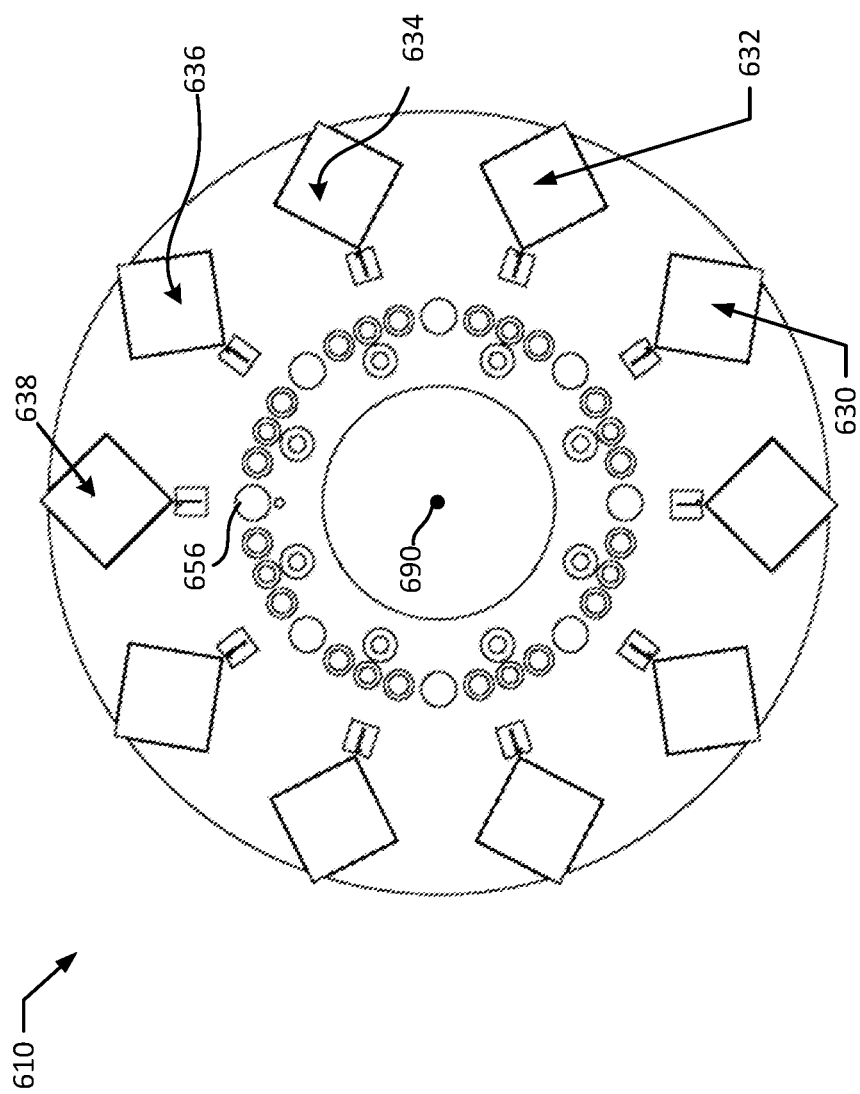

FIGS. 6A-6C illustrate another example flywheel section 600, according to an example embodiment. In particular, flywheel section 600 may represent an alternative embodiment of a flywheel section such as flywheel section 500. FIG. 6A is a perspective view of the flywheel section 600. FIG. 6B is a top view of the flywheel section 600.

As shown, the flywheel section 600 includes a plurality of rotor disks 602-610 disposed in a coaxial arrangement about a center or rotor axis 690. Although the rotor disks 602-610 are shown to have circular shapes, other shapes (e.g., oval shapes, etc.) of the rotor disks 602-610 are possible as well.

The disks 601-610 may be similar to the disks 502-508. For example, the disks 602-610 may be configured to rotate simultaneously about the rotor axis 690 (e.g., which may be similar to the axis 590) and may remain in the relative coaxial arrangement shown during the rotation about the axis 690. To that end, it is noted that some components of the flywheel section 600 are omitted from the illustrations of FIGS. 6A-6C for convenience in description. For example, although not shown, flywheel section 600 may include disk attachment brackets, similar to disk attachment bracket 510 for example, configured to attach the disks 602-610 in the coaxial arrangement shown. For instance, the disk attachment points 652-656 can be used to attach each respective disk 602-610, etc. to a respective disk attachment between the disk and an adjacent disk.

Each disk 602-610 includes a plurality of brackets, exemplified by brackets 612-620, disposed on the disk according to a same distribution pattern as that of magnets disposed on other disks 602-610. For example, the brackets on disk 602 (exemplified by bracket 612) may be spaced apart by a same bracket spacing offset (e.g., 36 degrees) about the axis 690. In general, the brackets 612-620, etc., may each be configured to receive a permanent magnet, similarly to the brackets 524-530 of flywheel section 500. However, as shown, the brackets 612-620, etc., have a square shape which may be shaped to receive square magnets.

For example, FIG. 6C illustrates a top view of the disk 610. In the illustrated example, a plurality of magnets 630-638, etc., are distributed about axis 690 according to the distribution pattern. Further, each magnet 630-638 is disposed in a respective bracket of the disk 610. For example, the magnet 630 may be disposed in the bracket 620, and so on. Further, as noted above, each of the magnets 630-638, etc. has a respective first surface (along the surface of the page) that faces the disk 608 and that has a square shape. In alternate examples, the respective first surfaces of the magnets 630-638, etc. may have a different shape (e.g., round shape such as the round shapes of brackets 524-530, rectangular shape, etc.). The magnets 630-638, etc., may include any type of permanent magnet, such as neodymium magnets for example.

In some examples, respective magnetic north poles of the plurality of magnets 630-638, etc., are positioned at a first side of the disk 610 (i.e., at the side shown in FIG. 6C), and each of the plurality of magnets 630-638 extends axially through the disk 610, similarly to the orientation of the magnets 552-558 shown in FIG. 5C for example.

Returning now to FIG. 6B, it is noted that portions of the disks 604-610 (e.g., the brackets 614-620) are projected onto the illustration of the top disk 602 in FIG. 6B using dashed lines for convenience in description. In particular, as best shown in FIG. 6B, angular positions of the brackets/magnets on each disk are offset from corresponding angular positions of an adjacent disk by a staggering angular offset. By way of example, where an angular position of bracket 612 is 0 degrees and the staggering angular offset is 6 degrees, the angular positions of brackets 614-620 may be, respectively, 6 degrees, 12 degrees, 18 degrees, and 24 degrees about axis 690. Thus, in some examples, a spacing angular offset (e.g., 36 degrees, etc.) between adjacent magnets on a same disk (e.g., between magnets 630 and 632) may be greater than a staggering angular offset (e.g., 6 degrees, etc.) between corresponding magnets on adjacent disks (e.g., between bracket 612 and 614).

In the illustrated example, the plurality of magnets (e.g., 630-638, etc.) on each disk 602-610 are at a same radial distance to the axis 690. In alternate examples, magnets on a first disk may be instead disposed at a different radial distance to axis 690 than magnets on a second disk.

Aspects of the subject matter described herein may be useful alone or in combination with one or more other aspects described herein.

In a first exemplary aspect, a flywheel is provided for use in a generator. The flywheel includes a plurality of hollow disks. Each hollow disk of the plurality of hollow disks includes a plurality of magnets angularly distributed around the hollow disk and a plurality of attachment points. The flywheel also includes a plurality of disk attachment brackets fastened to the plurality of hollow disks via the plurality of attachment points. The plurality of hollow disks may be spaced to accommodate a stator disk positioned between adjacent hollow disks.

In a second exemplary aspect according to the first exemplary aspect, the plurality of disk attachment brackets fasten the plurality of hollow disks such that respective magnets of two or more adjacent disks are arranged in a helical pattern around the flywheel.

In a third exemplary aspect according to the first or second exemplary aspects, the flywheel is suspended within the generator from a single point.

In a fourth exemplary aspect according to any of the first through third exemplary aspects, the flywheel is suspended within the generator from multiple points.

In a fifth exemplary aspect according to any of the first through fourth exemplary aspects, the flywheel is balanced during operation by a plurality of stabilization magnets positioned at a base of the generator.

In a sixth exemplary aspect according to any of the first through fifth exemplary aspects, the flywheel includes a plurality of flywheel sections. Each of the plurality of flywheel sections may include at least a subset of the plurality of hollow disks and at least a subset of the plurality of disk attachment brackets.

In a seventh exemplary aspect according to any of the first through sixth exemplary aspects, each of the plurality of magnets is surrounded by a non-magnetic metal on at least one side.

In an eighth exemplary aspect according to any of the first through seventh exemplary aspects, the plurality of magnets have a same size.

In a ninth exemplary aspect according to any of the first through eighth exemplary aspects, a first subset of the plurality of magnets are larger than a second subset of the plurality of magnets.

In a tenth exemplary aspect according to any of the first through ninth exemplary aspects, the stator disks contain a plurality of coils.

In an eleventh exemplary aspect according to the tenth exemplary aspect, each of the plurality of coils is formed from wire of a same gauge.

In a twelfth exemplary aspect according to any of the tenth and eleventh exemplary aspects, a first subset of the plurality of coils are formed from wire with a larger gauge than a second subset of the plurality of coils.

In a thirteenth exemplary aspect, a generator is provided that includes a flywheel. The flywheel may include a plurality of hollow disks containing a plurality of magnets angularly distributed around the plurality of hollow disks and a plurality of disk attachment brackets fastened to the plurality of hollow disks. The generator may also include a plurality of stator disks positioned between adjacent hollow disks of the plurality of hollow disks. The plurality of stator disks may contain a plurality of coils angularly distributed around the plurality of stator disks.

In a fourteenth exemplary aspect according to the thirteenth exemplary aspect, the plurality of disk attachment brackets fasten the plurality of hollow disks such that respective magnets in two or more adjacent disks are arranged in a helical pattern around the flywheel.

In a fifteenth exemplary aspect according to any of the thirteenth and fourteenth exemplary aspects, the flywheel is suspended within the generator at a single point.

In a sixteenth exemplary aspect according to any of the thirteenth through fifteenth exemplary aspects, the flywheel is balanced during operation by a plurality of stabilization magnets positioned at a base of the generator.

In a seventeenth exemplary aspect according to any of the thirteenth through sixteenth exemplary aspects, the flywheel is formed from a plurality of flywheel sections. Each of the plurality of flywheel sections may include at least a respective subset of the plurality of hollow disks and at least a respective subset of the plurality of disk attachment brackets.

In an eighteenth exemplary aspect according to any of the thirteenth through seventeenth exemplary aspects, the plurality of magnets have a same size.

In a nineteenth exemplary aspect according to any of the thirteenth through eighteenth exemplary aspects, a first subset of the plurality of magnets are larger than a second subset of the plurality of magnets.

In a twentieth exemplary aspect according to any of the thirteenth through nineteenth exemplary aspects, the plurality of coils are formed from wire of a same gauge.

In a twenty first exemplary aspect according to any of the thirteenth through twentieth exemplary aspects, a first subset of the plurality of coils are formed from wire with a larger gauge than a second subset of the plurality of coils.

In a twenty second exemplary aspect according to any of the thirteenth through twenty first exemplary aspects, the flywheel is suspended in a vacuum chamber.

In a twenty third exemplary aspect according to any of the thirteenth through twenty second exemplary aspects, the flywheel is suspended in the generator via one or more magnetic bearings.

In a twenty fourth exemplary aspect, a method is provided that includes assembling, with a plurality of disk attachment brackets, a plurality of hollow disks into a plurality of flywheel sections. The plurality of hollow disks may contain a plurality of magnets. The method may further include positioning, between adjacent hollow disks of the plurality of hollow disks, a plurality of stator disks containing a plurality of coils. The method may also include assembling the plurality of flywheel sections into a flywheel, attaching the flywheel at a single point in a generator, and rotating the flywheel while keeping the stator disks stationary to generate electrical current output by the generator.

In a twenty fifth exemplary aspect according to the twenty fourth exemplary aspect, each of the plurality of stator disks is positioned such that a distance between the plurality of coils and respective adjacent hollow disks is less than or equal to 0.25 inches.

In a twenty sixth exemplary aspect, a flywheel for use in a generator is provided. The flywheel includes a plurality of flywheel sections. Each flywheel section may include a plurality of hollow disks spaced to accommodate one or more stator disks, and a plurality of brackets angularly distributed around the hollow disks. The plurality of brackets are configured to receive permanent magnets. Each of the plurality of flywheel sections is hollow along an axis of rotation. At least one of the plurality of flywheel sections is formed from a single piece of material as a single structure using additive manufacturing.

In a twenty seventh exemplary aspect, a device is provided. The device includes a plurality of rotor disks disposed in a coaxial arrangement and configured to rotate about a rotor axis. The plurality of rotor disks includes a first disk and a second disk adjacent to the first disk in the coaxial arrangement. The device also includes a first plurality of magnets disposed in the first disk. The first plurality of magnets is angularly distributed about the rotor axis according to a distribution pattern. The device also includes a second plurality of magnets disposed in the second disk. The second plurality of magnets is angularly distributed about the rotor axis according to the distribution pattern. First angular positions of the first plurality of magnets about the rotor axis are offset from corresponding second angular positions of the second plurality of magnets.

In a twenty eighth exemplary aspect according to the twenty seventh exemplary aspect, each of the first angular positions is offset from a corresponding one of the second angular positions by a stagger angular offset.

In a twenty ninth exemplary aspect according to any of the twenty seventh and twenty eighth exemplary aspects, adjacent magnets of the first plurality of magnets are angularly separated in the distribution pattern by a spacing angular offset.

In a thirtieth exemplary aspect according to the twenty ninth exemplary aspect, the spacing angular offset is greater than the stagger angular offset.

In a thirty first exemplary aspect according to any of the twenty seventh through thirtieth exemplary aspects, each of the first plurality of magnets is disposed at a same radial distance to the rotor axis.

In a thirty second exemplary aspect according to any of the twenty seventh through thirty first exemplary aspects, each of the second plurality of magnets is disposed at the same radial distance to the rotor axis.

In a thirty third exemplary aspect according to any of the twenty seventh through thirty second exemplary aspects, respective magnetic north poles of the first plurality of magnets are positioned at a first side of the first disk. Each of the first plurality of magnets extends axially through the first disk.

In a thirty fourth exemplary aspect according to any of the twenty seventh through thirty third exemplary aspects, a first surface of a given magnet of the first plurality of magnets is exposed at a first side of the first disk facing the second disk.

In a thirty fifth exemplary aspect according to the thirty fourth exemplary aspect, the first surface has a square shape.

In a thirty sixth exemplary aspect according to the thirty fourth exemplary aspect, the first surface has a round shape.

In a thirty seventh exemplary aspect according to any of the twenty seventh through thirty sixth exemplary aspects, at least one of the first plurality of magnets is a neodymium magnet.

The presently discussed generator designs and corresponding flywheels result in multiple unexpected and practical benefits when used in an operating generator. In some examples, a lower weight of the flywheel in the generator may be selected to reduce the overall energy required to initialize operation of the generator. Furthermore, by increasing the moment of inertia for the flywheel, the flywheel itself can continue spinning for longer and with less energy, improving the operating efficiency of the generator overall. Also, in examples, arranging magnets in a helical arrangement around the flywheel may further reduce the energy required to keep the flywheel spinning, as such an arrangement can create a propulsive magnetic force that continues to assist with propelling flywheel when in operation. Overall, these benefits can result in a significant overall improvement to the efficiency of the generator.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A flywheel for use in a generator, the flywheel comprising:
   a plurality of rotor disks, each rotor disk of the plurality of rotor disks comprising:
      a plurality of magnets angularly distributed around that rotor disk; and
      a plurality of attachment points distributed around that rotor disk inward relative to where the plurality of magnets are located, wherein each rotor disk defines a first hollow portion inward to where the plurality of attachment points are located;
   a plurality of disk attachment brackets wherein each disk attachment bracket of the plurality of disk attachment brackets is fastened to at least two rotor disks of the plurality of rotor disks via the plurality of attachment points, wherein each disk attachment bracket of the plurality of disk attachment brackets defines a ring having a second hollow portion inward to where that disk attachment bracket is fastened to the two rotor disks of the plurality of rotor disks that is concentrically aligned with the first hollow portion of each rotor disk of the plurality of rotor disks when so fastened; and
   a flywheel attachment bracket connected to a first rotor disk of the plurality of rotor disks on a first side and to a bearing housing of the generator on a second side, opposite to the first side,
   wherein the first rotor disk of plurality of rotor disks is spaced apart from a second rotor disk of the plurality of rotor disks via a first disk attachment bracket of the plurality of disk attachment brackets connected to each of the first rotor disk and the second rotor disk of the plurality of rotor disks to accommodate a first stator disk positioned between the first rotor disk and the second rotor disk of the plurality of rotor disks, and the second rotor disk of the plurality of rotor disks is spaced apart from a third rotor disk of the plurality of rotor disks via a second disk attachment bracket of the plurality of disk attachment brackets connected to each of the second rotor disk and the third rotor disk of the plurality of rotor disks to accommodate a second stator disk positioned between the second rotor disk and the third rotor disk of the plurality of rotor disks.

2. The flywheel of claim 1, wherein the plurality of disk attachment brackets fasten the plurality of rotor disks such that respective magnets of adjacent rotor disks of the plurality of rotor disks are arranged in a helical pattern relative to magnets of each other around an axis of rotation of the plurality of rotor disks.

3. The flywheel of claim 1, wherein the plurality of rotor disks is suspended within the generator from a single point in which the second side of the flywheel attachment bracket rests on top of a plurality of bearings within the bearing housing.

4. The flywheel of claim 1, wherein the plurality of rotor disks is suspended within the generator from multiple points.

5. The flywheel of claim 1, wherein the plurality of rotor disks is stabilized during operation by a plurality of stabilization magnets positioned at a base of the generator.

6. The flywheel of claim 1, wherein the flywheel includes a plurality of flywheel sections, each of the plurality of flywheel sections comprising at least a subset of the plurality of hollow disks and at least a subset of the plurality of disk attachment brackets.

7. The flywheel of claim 1, wherein each of the plurality of magnets is surrounded by a non-magnetic metal on at least one side.

8. The flywheel of claim 1, wherein every magnet of the plurality of magnets is a same size as every other magnet of the plurality of magnets.

9. The flywheel of claim 1, wherein magnets of a first subset of the plurality of magnets are larger than magnets of a second subset of the plurality of magnets.

10. The flywheel of claim 1, wherein the first stator disk contains a plurality of coils, and the second stator disk contains a second plurality of coils.

11. The flywheel of claim 10, wherein each coil the first plurality of coils and of the second plurality of coils is formed from wire of a same gauge.

12. The flywheel of claim 10, wherein coils of the first plurality of coils are formed from wire with a larger gauge than coils of the second plurality of coils.

13. A generator, comprising the flywheel of claim 1, and the generator further comprising:
   a plurality of stator disks positioned between adjacent rotor disks of the plurality of rotor disks, the plurality of stator disks containing a plurality of coils angularly distributed around the plurality of stator disks.

14. A generator comprising:
   a flywheel comprising:
      a plurality of rotor disks, each rotor disk of the plurality of rotor disks comprising:
         a plurality of magnets angularly distributed around that rotor disk;
         a plurality of attachment points distributed around that rotor disk inward relative to where the plurality of magnets are located, wherein each rotor disk defines a first hollow portion inward to where the plurality of attachment points are located; and
      a plurality of disk attachment brackets each fastened to two rotor disks of the plurality of rotor disks via the plurality of attachment points, wherein each disk attachment bracket of the plurality of disk attachment brackets defines a ring having a second hollow portion inward to where that disk attachment bracket is fastened to the two rotor disks of the plurality of rotor disks that is concentrically aligned with the first hollow portion of each rotor disk of the plurality of rotor disks when so fastened; and
   a plurality of stator disks positioned between adjacent rotor disks of the plurality of rotor disks, the plurality of stator disks containing a plurality of coils angularly distributed around the plurality of statordisks, wherein the first hollow portion and the second hollow portion define an unoccupied hollow extending along an axis of rotation that extends an entire length of the flywheel and is enclosed by the plurality of rotor disks and the plurality of disk attachment brackets.

15. The generator of claim 14, wherein the plurality of disk attachment brackets fasten the plurality of rotor disks such that respective magnets in two or more adjacent rotor disks are arranged in a helical pattern around the flywheel.

16. The generator of claim 14, wherein the flywheel is suspended within the generator at a single point.

17. The generator of claim 14, wherein the flywheel is balanced during operation by a plurality of stabilization magnets positioned at a base of the generator.

18. The generator of claim 14, wherein the flywheel is formed from a plurality of flywheel sections, each of the plurality of flywheel sections comprising at least a respective subset of the plurality of hollow disks and at least a respective subset of the plurality of disk attachment brackets.

19. The generator of claim 14, wherein every magnet of the plurality of magnets is a same size as every other magnet of the plurality of magnets.

20. The generator of claim 14, wherein magnets of a first subset of the plurality of magnets are larger than magnets of a second subset of the plurality of magnets.

21. The generator of claim 14, wherein coils of the plurality of coils are formed from wire of a same gauge.

22. The generator of claim 14, wherein coils of a first subset of the plurality of coils are formed from wire with a larger gauge than coils of a second subset of the plurality of coils.

23. The generator of claim 14, wherein the flywheel is disposed in a vacuum chamber.

24. The generator of claim 14, wherein the flywheel is suspended in the generator via one or more magnetic bearings.

25. A device comprising:
a plurality of rotor disks disposed in a coaxial arrangement and configured to rotate about a rotor axis, the plurality of rotor disks including a first rotor disk and a second rotor disk adjacent to the first disk in the coaxial arrangement;
a first plurality of magnets disposed in the first rotor disk, the first plurality of magnets angularly distributed about the rotor axis according to a distribution pattern; and
a second plurality of magnets disposed in the second rotor disk, the second plurality of magnets angularly distributed about the rotor axis according to the distribution pattern, and
wherein:
first angular positions of the first plurality of magnets about the rotor axis are offset from corresponding second angular positions of the second plurality of magnets,
the first rotor disk and the second rotor disk define an unoccupied hollow that extends for an entire length of the coaxial arrangement along the rotor axis,
each rotor disk of the plurality of rotor disks each comprise a plurality of attachment points distributed around that rotor disk inward relative to where respective magnets are located, wherein each rotor disk defines a first hollow portion inward to where the plurality of attachment points are located; and further comprising:
a plurality of disk attachment brackets each fastened to at least one rotor disk of the plurality of rotor disks via the plurality of attachment points, wherein each disk attachment bracket of the plurality of disk attachment brackets defines a ring having a second hollow portion inward to where that disk attachment bracket is fastened to one or more rotor disks of the plurality of rotor disks that is concentrically aligned with the first hollow portion of each rotor disk of the plurality of rotor disks when so fastened; and
a plurality of stator disks positioned between adjacent rotor disks of the plurality of rotor disks, the plurality of stator disks containing a plurality of coils angularly distributed around the plurality of stator disks.

26. The device of claim 25, wherein each angular position of the first angular positions is offset from a corresponding angular position of the second angular positions by a staggered angular offset.

27. The device of claim 26, wherein adjacent magnets of the first plurality of magnets are angularly separated in the distribution pattern by a spacing angular offset.

28. The device of claim 27, wherein the spacing angular offset is greater than the staggered angular offset.

29. The device of claim 25, wherein each magnet of the first plurality of magnets is disposed at a first radial distance to the rotor axis.

30. The device of claim 29, wherein each magnet of the second plurality of magnets is disposed at the first radial distance to the rotor axis.

31. The device of claim 25, wherein respective magnetic north poles of the first plurality of magnets are positioned at a first side of the first rotor disk, and wherein each of the first plurality of magnets extends axially through the first rotor disk.

32. The device of claim 25, wherein a first surface of a given magnet of the first plurality of magnets is exposed at a first side of the first rotor disk facing the second rotor disk.

33. The device of claim 32, wherein the first surface has a square shape.

34. The device of claim 32, wherein the first surface has a round shape.

35. The device of claim 25, wherein at least one magnet of the first plurality of magnets is a neodymium magnet.

* * * * *